March 29, 1960     J. D. ROGERS     2,930,190
BYPASS GAS TURBINE POWER PLANT EMPLOYING REGENERATIVE CYCLE
Filed April 29, 1958
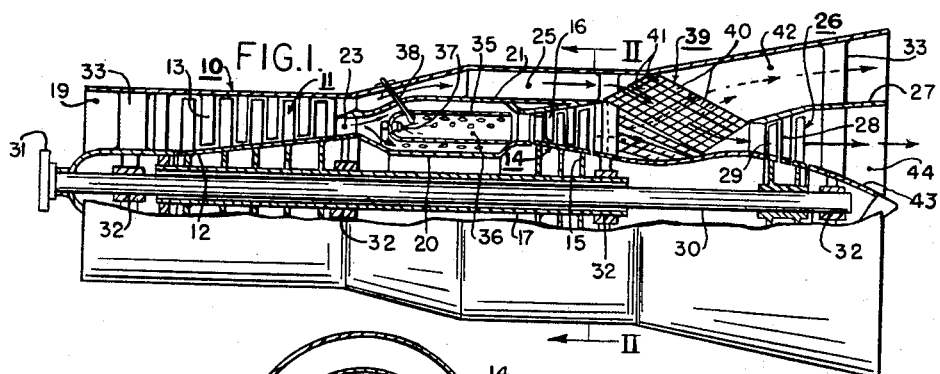
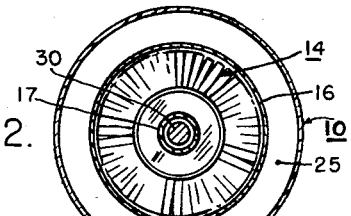
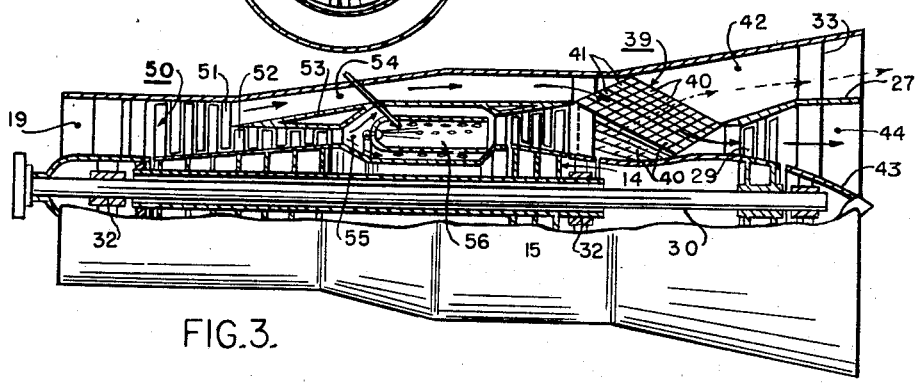
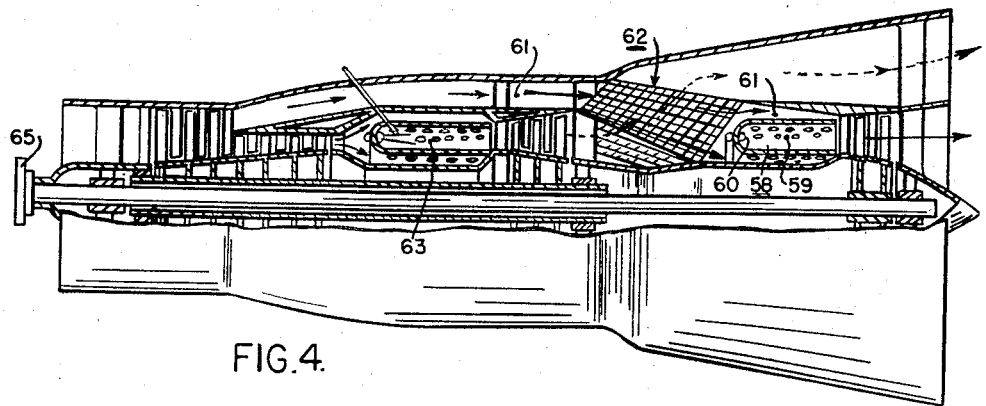
INVENTOR
JOHN D. ROGERS

United States Patent Office 2,930,190
Patented Mar. 29, 1960

2,930,190

BYPASS GAS TURBINE POWER PLANT EMPLOYING REGENERATIVE CYCLE

John D. Rogers, Prairie Village, Kans., assignor to Westinghouse Electric Corporation, East Pittsburgh, Pa., a corporation of Pennsylvania Application April 29, 1958, Serial No. 731,758

5 Claims. (Cl. 60—39.18)

This invention relates to gas turbine power plants for delivering shaft power, more particularly to gas turbine power plants employing a regenerative cycle and has for an object to provide an improved plant of the above type having a minimum of ducting and weight.

It is a further object of the invention to provide an improved gas turbine power plant employing a regenerative cycle in which the ratio of bulk/horsepower output is minimized and a high operating efficiency is attained with low to medium pressure ratios.

Briefly, the invention provides a unitary gas turbine power plant in which the compressed air from a multiple stage air compressor is divided, the inner portion of the air stream passing through a primary fuel combustion chamber to motivate a first gas turbine and the outer portion of the air stream bypassing the primary combustion chamber and first turbine to motivate a second gas turbine. The first turbine drives the compressor and is designed to fully expand the hot motive gas stream, so that substantially all the extractable energy of said gas stream is utilized to drive the compressor. The thus expanded inner gas stream is then directed through a heat exchanger to heat the outer portion of the air stream which then motivates the second gas turbine. The two vitiated gas streams are then exhausted to the atmosphere. The second gas turbine provides externally available shaft horsepower for driving any suitable load and its rotor is preferably, though not essentially, mounted for independent rotation relative to the rotor of the first turbine.

The outer air stream may be provided by a mid-compressor stage so that its pressure is lower than that of the inner air stream, or it may be provided by a common compressor outlet so that the initial pressures of the two air streams are substantially equal.

If additional shaft horsepower is desired, a secondary fuel combustion chamber may be provided for further heating the outer air stream after initial heating in the heat exchanger but before admission to the second turbine.

The foregoing and other objects are effected by the invention as will be apparent from the following description and claims taken in connection with the accompanying drawings, forming a part of this application, in which:

Fig. 1 is a side view, illustrating diagrammatically a unitary gas turbine power plant incorporating the invention, with the upper radial portion in section;

Fig. 2 is a transverse sectional view taken on line II—II of Fig. 1 and looking in the direction indicated by the arrows; and Figs. 3 and 4 are views similar to Fig. 1 but illustrating further embodimnets of the invention.

Referring to the drawing in detail, especially Figs. 1 and 2, there is shown a unitary gas turbine power plant comprising a tubular outer casing 10 having received therein a multiple stage air compressor 11 of the axial flow type comprising a bladed rotor 12 and a bladed stator 13, a gas turbine 14 of the axial flow type comprising a bladed rotor 15 and a bladed stator 16, and a tubular shaft 17 connecting the turbine and compressor rotors 15 and 12, respectively, for joint operation.

As viewed in Fig. 1, the left hand end of the outer casing 10 defines the outer periphery of an air intake opening 19 for admitting air to the compressor 11. Within the outer casing 10, tubular inner core structure 20, disposed concentrically about the shaft 17, and tubular wall or duct structure 21 disposed intermediate the inner core structure and the outer casing jointly define an inner or primary air passageway 23 of annular shape for directing a portion of the compressed air from the outlet of the compressor 11 to the inlet of the turbine 14. In a similar manner, the intermediate duct structure 21 and the outer casing 10 define an outer or secondary air passageway 25 of annular shape for directing the remaining portion of compressed air from the compressor about the turbine 14 to a second turbine 26.

The second turbine 26 is employed to provide external shaft power and is provided with a tubular shell 27 encompassing a bladed stator 28 and a bladed rotor 29. The rotor 29 is attached to an elongated shaft 30, co-axially aligned with and extending through the compressor drive shaft 17 to the exterior of the power plant, provided with a flange 31 or other suitable means for coupling the shaft to a load (not shown).

The two shafts 17 and 30 are supported for independent rotation by suitable bearing structure 32 anchored to the outer casing 10 by suitable radially extending strut members 33.

Within the primary air passageway 23 there is provided primary fuel combustion structure 35 defining a fuel combustion chamber 36 having suitable fuel injecting nozzle structure 37 for admitting fuel thereto from any suitable supply source (not shown) and suitable ignitor structure 38.

Intermediate the outlet of the turbine 14 and the inlet of the turbine 26 there is provided an annular heat exchanger 39 formed in any suitable manner to provide a plurality of passages 40 and 41 extending transversely to each other and interlaced in a manner to provide good heat exchange between the hot exhaust gases from the outlet of the turbine 14 and the relatively cool compressed air directed through the outer passageway 25 into the turbine 26. Details of the heat exchanger 39 are not shown, since they are not considered to be essential for comprehension of the invention. However, it will be understood that the air stream flowing radially inwardly through passages 41 extracts a portion of the sensible heat from the hot exhaust gases flowing radially outwardly through the passages 40, which heat would otherwise be wasted.

The turbine shell 27 is disposed concentrically with the outer casing 10 and jointly therewith defines an outer annular exhaust passageway 42 communicating with the heat exchanger passages 40 and bypassing the turbine 26. In a similar manner, the turbine shell defines with a rearwardly disposed central conical member 43 an inner annular exhaust passageway 44 communicating with the outlet of the power turbine 26.

In operation, fuel is admitted to the primary fuel combustion chamber 36 by the fuel injecting nozzles 37 and ignited by the igniter 38 to provide hot gases for driving the turbine rotor 15, which, in turn, drives the compressor rotor 12. Thus, air is drawn through the air intake 19 and pressurized by the compressor. A portion of the thus pressurized air is supplied through passageway 23 to the combustion chamber to support the fuel combustion process, while the remaining portion is delivered to the power turbine 26 through the outer passageway 25. The gases exhausted by the turbine 14 are substantially hotter than the air flow in the outer passage 25. Hence, additional kinetic energy is imparted by the gases to the air during their flow through the heat exchanger 39, so that substantially all of the available energy, over and above that required to drive the compressor 11, is extracted by the power turbine 26 as horsepower available at the coupling flange 31. The thus vitiated gas and air streams are subsequently exhausted to the atmosphere through the exhaust passages 42 and 44, respectively.

In Fig. 3 there is shown a second embodiment of the invention. This embodiment is similar to the embodiment shown in Fig. 1, but employs a multiple stage compressor 50 divided at an intermediate stage to provide a low pressure section 51 and a high pressure section 52. The intermediate duct structure 53 is extended to the outlet of the low pressure section 51, so that compressed air at a lower pressure value than in the first embodiment is supplied to the secondary or outer annular passageway 54. The outlet of the high pressure section 52 communicates with the inner or primary passageway 55, so that compressed air at a higher pressure value than in the first embodiment is delivered to the primary combustion chamber 56.

Since the remaining structure may be identical, it need not be further described. Further, the operation of the power plant shown in Fig. 3 is substantially the same as that of the power plant shown in Fig. 1.

In Fig. 4 there is shown a power plant illustrating a further modification of the invention. This power plant is similar to that shown in Fig. 3 but in addition further includes secondary combustion structure 58 providing an annular combustion chamber 59 to which fuel may be admitted from a suitable source (not shown) by injecting nozzle structure 60. The combustion structure 58 is disposed in the secondary air passageway 61, preferably downstream of an annular heat exchanger 62.

The operation of this power plant is similar to that shown in Fig. 1 but does lend itself to more flexibility of operation, since the primary combustion structure 63 may be operated alone, if desired, or concomitantly with the secondary combustion structure 58.

The secondary combustion structure may be employed when it is desired to increase the horsepower output at the load coupling member 65. The rate at which fuel is admitted to the primary and/or secondary combustion structures 63 and 58 by the injecting nozzle structure may be modulated by suitable fuel control mechanism (not shown), to vary the shaft horsepower, as desired. With this arrangement, it is expected that the specific fuel consumption per unit of power developed will remain substantially constant or even decrease somewhat during conditions when partial power is desired, such as during cruising conditions.

The embodiments shown in Figs. 3 and 4 are particularly desirable, since, by supplying compressed air to the secondary passage from the low pressure section 51 of the compressor, an inherent surge margin for acceleration of the compressor is provided, rendering variable compressor geometry structure unnecessary.

It will now be seen that the invention provides a compact power plant in which a regenerative cycle is attained with a minimum of duct structure and fluid flow reversal. Hence the specific weight and bulk of the power plant is reduced to a minimum with attendant reduction in fluid flow losses.

It will further be seen that a power plant is provided in which there is a minimum of external fire hazard, since the highly heated structural portions such as the combustion structure and turbine structure are disposed within the intermediate duct structure and isolated from the outer casing structure by streams of relatively cool fluid.

While the invention has been shown in several forms, it will be obvious to those skilled in the art that it is not so limited, but is susceptible of various other changes and modifications without departing from the spirit thereof.

What is claimed is:

1. A gas turbine power plant comprising a multiple stage air compressor, a first gas turbine for driving said compressor, casing structure providing a primary passageway communicating with the outlet of said compressor and the inlet of said first gas turbine, a combustion chamber disposed in said primary passageway, means for admitting fuel to said combustion chamber to provide a combustible fuel and air mixture, means for igniting said mixture whereby to provide hot motive gases for said first turbine, a second gas turbine for delivering shaft power, casing structure providing a secondary passageway bypassing said first gas turbine and communicating with the outlet of said compressor and the inlet of said second gas turbine, whereby compressed air is provided for said second turbine, means providing a third passageway bypassing said second gas turbine and communicating with the outlet of said first gas turbine, and a heat exchange structure disposed in good heat transfer relation with said second and third passageways, said heat exchange structure being effective to transfer heat from the hot gas stream in said third passageway to the compressed air stream in said second passageway, whereby the heated compressed air is effective to drive said second turbine.

2. A gas turbine power plant comprising a multiple stage air compressor having a rotor, a first gas turbine having a rotor drivingly connected to said compressor rotor, tubular casing structure providing an annular primary passageway communicating with the outlet of said compressor and the inlet of said first gas turbine, a combustion chamber disposed in said primary passageway, means for admitting fuel to said combustion chamber to provide a combustible fuel and air mixture, means for igniting said mixture whereby to provide hot motive gases for said first turbine, a second gas turbine having a rotor for delivering shaft power, means supporting said second turbine rotor for rotation relative to said first turbine rotor, tubular casing structure providing an annular secondary passageway bypassing said first gas turbine and communicating with the outlet of said compressor and the inlet of said second gas turbine, whereby compressed air is provided for said second turbine, means providing a third passageway bypassing said second gas turbine and communicating with the outlet of said first gas turbine, and a heat exchange structure disposed in good heat transfer relation with said second and third passageways, said heat exchange structure being effective to transfer heat from the hot gas stream in said third passageway to the compressed air stream in said second passageway, whereby the heated compressed air is effective to drive said second turbine, said compressor rotor and said first and second turbine rotors being coaxially aligned.

3. A gas turbine power plant comprising a multiple stage air compressor, a first gas turbine for driving said compressor, casing structure providing a primary passageway communicating with the outlet of said compressor and the inlet of said first gas turbine, a first combustion chamber disposed in said primary passageway, means for admitting fuel to said first combustion chamber to provide a combustible fuel and air mixture, means for igniting said mixture whereby to provide hot motive gases for said first turbine, a second gas turbine for delivering shaft power, casing structure providing a secondary passageway bypassing said first gas turbine and communicating with the outlet of said compressor and the inlet of said second gas turbine, whereby compressed air is directed through said secondary passageway, means providing a third passageway bypassing said second gas turbine and communicating with the outlet of said first gas turbine, a heat exchange structure disposed in good heat transfer relation with said second and third passageways, said heat exchange structure being effective to transfer heat from the hot gas stream in said third passageway to the compressed air stream in said second passageway, a second combustion chamber disposed in said second passageway downstream of said heat exchange structure, means for admitting fuel to said second combustion chamber to provide a combustible fuel and air mixture, and means for igniting said mixture, whereby to provide hot motive gases for said second turbine.

4. A gas turbine power plant comprising a multiple stage air compressor having a low pressure section and a high pressure section, a first gas turbine for driving said compressor, tubular wall structure providing an annular primary passageway communicating with the outlet of said high pressure compressor section and the inlet of said first gas turbine, a combustion chamber disposed in said primary passageway, means for admitting fuel to said combustion chamber to provide a combustible fuel and air mixture, means for igniting said mixture whereby to provide hot motive gases for said first turbine, a second gas turbine for delivering shaft power, casing structure providing an annular secondary passageway bypassing said first gas turbine and communicating with the outlet of said low pressure compressor section and the inlet of said second gas turbine, whereby compressed air is provided for said second turbine, said high pressure compressor section and said first turbine being encompassed by said secondary passageway, means providing a third passageway bypassing said second gas turbine and communicating with the outlet of said first gas turbine, and a heat exchange structure disposed in good heat transfer relation with said second and third passageways, said heat exchange strutcure being effective to transfer heat from the hot gas stream in said third passageway to the compressed air stream in said second passageway, whereby the heated compressed air is effective to drive said second turbine, said compressor and said first and second turbines being in mutually coaxial alignment.

5. A gas turbine power plant comprising a multiple stage air compressor having a low pressure section and a high pressure section, a first gas turbine for driving said compressor, tubular wall structure providing an annular primary passageway communicating with the outlet of said high pressure compressor section and the inlet of said first gas turbine, a first combustion chamber disposed in said primary passageway, means for admitting fuel to said combustion chamber to provide a combustible fuel and air mixture, means for igniting said mixture whereby to provide hot motive gases for said first turbine, a second gas turbine for delivering shaft power, tubular casing structure providing an annular secondary passageway bypassing said first gas turbine and communicating with the outlet of said low pressure compressor section and the inlet of said second gas turbine, whereby compressed air is directed through said secondary passageway, said high pressure compressor section and said first turbine being encompassed by said secondary passageway, means providing a third passageway bypassing said second gas turbine and communicating with the outlet of said first gas turbine, an annular heat exchange structure disposed in good heat transfer relation with said second and third passageways, said heat exchange structure being effective to transfer heat from the hot gas stream in said third passageway to the compressed air stream in said second passageway, a second combustion chamber disposed in said second passageway downstream of said heat exchange structure, means for admitting fuel to said second combustion chamber for combustion purposes, whereby to provide hot motive gases for said second turbine.

No references cited.